United States Patent [19]

Fariel et al.

[11] 4,273,793
[45] Jun. 16, 1981

[54] APPARATUS AND PROCESS FOR THE PREPARATION OF GASIFIED CONFECTIONARIES BY PRESSURIZED INJECTION MOLDING

[75] Inventors: Harry F. Fariel, Suffern, N.Y.; Marvin J. Rudolph, Bethel; Richard B. Hynson, New Fairfield, both of Conn.; Pradip K. Roy, Yorktown; Fredric Kleiner, New City, both of N.Y.

[73] Assignee: General Foods Corporation, White Plains, N.Y.

[21] Appl. No.: 88,485

[22] Filed: Oct. 26, 1979

[51] Int. Cl.³ .............. A23L 1/07; A23G 3/12; A23P 1/00; B29D 27/00
[52] U.S. Cl. .................. 426/572; 264/50; 264/328.1; 264/DIG. 83; 425/4 R; 425/552; 426/660; 426/474; 426/512; 426/515
[58] Field of Search ............ 425/4 R, 552; 426/512, 426/572, 515, 660, 474; 264/55, 51, 53, 54, 41, 48, 50, DIG. 83, 328.1

[56] References Cited

U.S. PATENT DOCUMENTS

| | | | |
|---|---|---|---|
| 2,980,539 | 4/1961 | Bevarly | 264/55 X |
| 3,012,893 | 12/1961 | Kremzner et al. | 426/572 |
| 3,268,635 | 8/1966 | Kraus et al. | 264/55 X |
| 3,542,270 | 11/1970 | Schubiger et al. | 426/572 |
| 3,556,812 | 1/1971 | Krohn et al. | 426/572 |
| 3,769,029 | 10/1973 | Ganz | 426/512 X |
| 3,798,337 | 3/1974 | Abalo | 426/572 X |
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |
| 4,126,704 | 11/1978 | McCarthy et al. | 426/512 X |

FOREIGN PATENT DOCUMENTS

| | | | |
|---|---|---|---|
| 576880 | 6/1959 | Canada | 426/515 |
| 645446 | 7/1962 | Canada | 426/512 |

Primary Examiner—Philip Anderson
Attorney, Agent, or Firm—Daniel J. Donovan; Bruno P. Struzzi; Thomas R. Savoie

[57] ABSTRACT

An injection molding arrangement and process for producing regularly shaped pieces of gasified candy which effect a pleasant sizzling sensation in the mouth. A confectionary solution, which may be a sugar melt, is subjected to a superatmospheric carbonating pressure in a carbonating vessel to cause absorption therein of carbon dioxide. An injection mold for forming the solution into suitably shaped pieces of candy is prepressurized at a superatmospheric carbonation pressure prior to the injection therein of the confectionary solution. The solution is then injected into the mold at a pressure substantially above the superatmospheric pressure in the carbonation vessel. The solution is then allowed to cool and solidify in the pressurized mold, producing regularly shaped pieces of carbonated candy.

21 Claims, 4 Drawing Figures

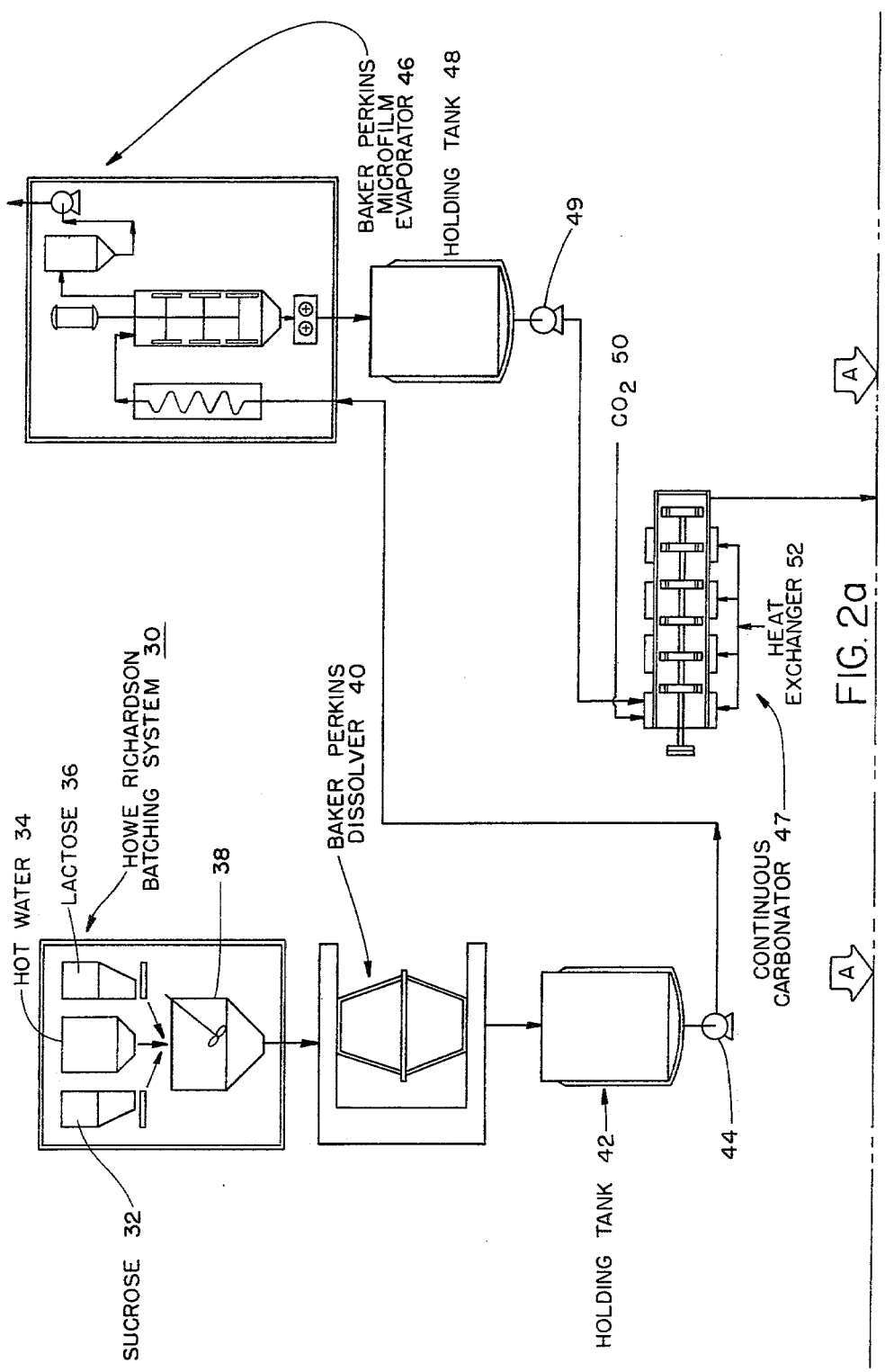

APPARATUS AND PROCESS FOR THE PREPARATION OF GASIFIED CONFECTIONARIES BY PRESSURIZED INJECTION MOLDING

BACKGROUND OF THE INVENTION

1. Field of the Invention

The present invention relates generally to a process and system for molding gasified candy pieces from a gasified confectionary solution. More particularly, the present invention pertains to a process and system for injection molding a carbonated sugar solution into suitably shaped pieces of carbonated confectionary.

2. Description of the Prior Art

Kremzner et al. U.S. Pat. No. 3,012,893 relates to a hard candy which has carbon dioxide absorbed therein. In accordance with the teachings of the prior art, a candy of this kind is made by a process which comprises melting crystalline sugar to form a sugar solution, subjecting the melted sugar solution to pressurized carbon dioxide at a pressure of from 50-1000 psig for a sufficient time to permit absorption of from 0.5-15 ml of gas per gram of solution, and cooling the solution under pressure to produce a solid amorphous product which is carbonated. Depressurizing the carbonated candy to atmospheric pressure results in its fracturing randomly into granules of assorted sizes. The resultant product is then sieved to remove the smaller fines. The larger sized pieces are packaged for commercial sale, but a suitable commercial usage has not yet been found for the smaller carbonated candy fines.

The larger pieces sold as a commercial product are irregularly and randomly sized, and have the appearance of broken glass or sharp-edged pieces of gravel. Carbon dioxide is entrained within the carbonated candy as solidified bubbles having a diameter ranging from 3-1000 microns with more than 50% of the bubbles having a diameter greater than 60 microns.

When carbonated candy of this kind is placed in the mouth, it produces an entertaining but short-lived popping sensation therein. As the candy pieces are wetted and warmed in the mouth, the candy melts releasing the carbon dioxide bubbles and producing a tingling, popping effect in the mouth.

Kirkpatrick U.S. Pat. Nos. 3,985,909 and 3,985,910 and Hegadron U.S. Pat. No. 4,001,457 disclose further details on processes for producing hard candy of the type disclosed by Kremzner et al.

SUMMARY OF THE INVENTION

A primary object of the present invention is to provide an arrangement and process for producing gasified candy which has associated therewith a pleasant, sizzling sensation in the mouth rather than the popping effect of candy produced in accordance with the prior art.

Another object of the present invention resides in the provision of a process and arrangement for producing a gasified candy product which does not produce the wasteful side products in the form of fines as in the prior art, although some waste is still encountered in the runners of the molds employed in the present invention.

A further objective of the present invention is the production of regularly shaped pieces of gasified candy having the gas retained therein in concentrations of 0.25–5.00 cc of gas per gram of candy, with the gas being evenly distributed therethrough as bubbles having an average diameter in the range of 10 to 60 microns, preferably in the range of 20 to 55 microns, and more preferably in the range of 30 to 55 microns. The smaller average bubble diameter and narrower range of distribution in the average bubble diameter produces a prolonged sizzling feeling in the mouth rather than the short-lived popping sensation associated with prior art candies.

Pursuant to the teachings herein, an arrangement and process is disclosed for preparing gasified candy by pressurized injection in a mold. A confectionary solution is produced, and is then subjected to a superatmospheric gas pressure in a pressurizing vessel for a sufficient length of time to cause absorption of the gas into the confectionary solution. An injection mold for forming the solution into suitably shaped pieces of candy is prepressurized at a superatmospheric gas pressure prior to injection of the solution therein. The confectionary solution is then injected into the mold at a pressure above the superatmospheric pressure to which the confectionary solution was previously subjected, causing the solution to flow into suitably shaped cavities in the mold. The solution is then allowed to cool and solidify in the mold, producing regularly shaped pieces of gasified confectionary product.

Furthermore in accordance with the teachings herein, the pressurizing vessel has a mixer therein which assists in absorption of gas into the solution, and also results in a significant decrease in the average diameter size of bubbles therein. Moreover, the gasified solution prepared in the pressurizing vessel is injected into a suitable mold at a pressure which is preferably several times the pressure utilized to gasify the solution. The higher injection pressure further assists in reducing the average bubble size, and results in a clarified, more translucent confectionary product, as the clarity of the product is related to the size of the bubbles entrained therein. In one preferred embodiment, the injection pressure is five times the gasification pressure of the confectionary solution.

In accordance with preferred embodiments disclosed herein, a pressurized vessel subjects a sugar based confectionary solution to carbon dioxide pressure in the range from 50–500 psig, preferably in the 350–450 psig pressure range. The sugar based solution is maintained at a temperature therein in the range from 280° to 320° F. necessary to reach the desired moisture content. The pressurizing vessel includes a mixer therein having blades which are rotated between 200 and 1500 rpm, with the preferred range being 700–900 rpm.

Accordingly, a primary object of the present invention is the provision of a carbonated confectionary product having a regular shape which produces a prolonged and pleasant sizzling sensation in the mouth.

BRIEF DESCRIPTION OF THE DRAWINGS

The foregoing and other objects and advantages of the novel apparatus and process for preparing gasified confectionaries pursuant to the teachings of the present invention may be readily understood by one skilled in the art, having reference to the following detailed description of several preferred embodiments thereof, taken in conjunction with the accompanying drawings wherein identical reference numerals are utilized to refer to like elements throughout the several views, and in which:

FIGS. 2A and 2B together provide a more detailed illustration of one embodiment of a system for preparing carbonated candy by pressurized injection in a mold.

DETAILED DESCRIPTION OF THE DRAWINGS

Figure 1:
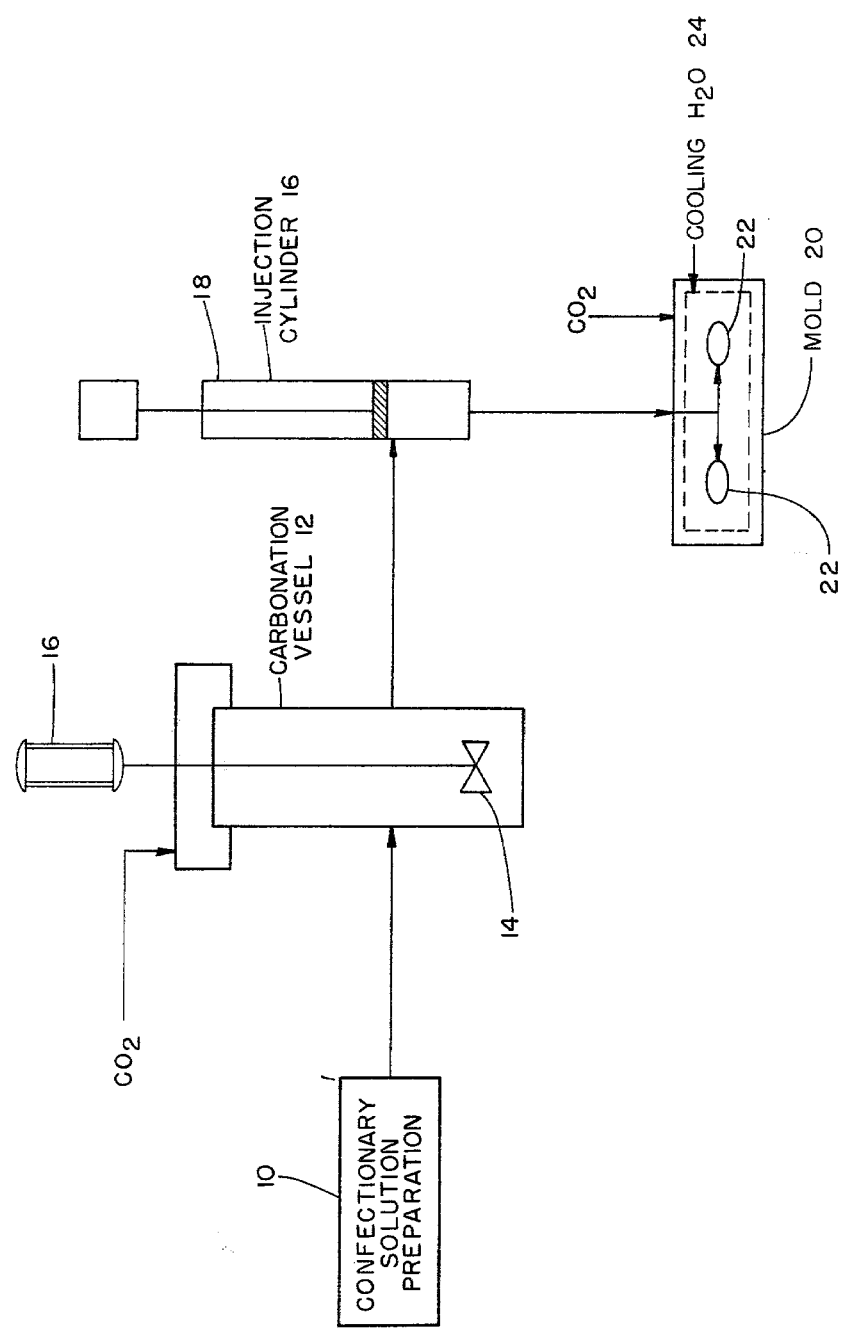
FIG. 1 is a conceptual illustration of the present invention for producing carbonated confectionaries.

Referring to FIG. 1 in detail, a schematic arrangement is illustrated for preparing gasified candy by pressurized injection in a mold. A vessel 10 is utilized to prepare a suitable confectionary solution for the production of a candy. The confectionary solution can be prepared from any of the commercially available sugars such as glucose, fructose, sucrose, lactose, etc., either alone or in combination. Alternatively the confectionary solution may have a base formed from ingredients other than sugar. A mixture of 30% lactose and 70% sucrose produces an excellent carbonated confectionary product. A mixture of sucrose with corn syrup (containing glucose, maltose, and dextrin) is also very satisfactory. In one preferred solution, a mixture of sucrose, lactose and corn syrup in ratios of 52:27:21 produces a preferred confectionary product characterized by excellent gas retention and reduced stickiness on standing. The moisture content of the prepared confectionary solution is typically between 1 and 4 percent of the solution, and is preferably between 2 and 3%.

The confectionary solution may also have added coloring, flavorants and/or other active ingredients to enhance the aesthetic appeal of the resulting confectionary product, and to provide a pleasant taste to complement the sizzling sensation of the gasified candy. These ingredients are normally added after the desired moisture content of the solution has been achieved. Commercially available colorings are produced in a variety of shades, any of which may be utilized herein. The choice of coloring may be dependent upon the desired aesthetic effect and also possibly upon the flavorant. Flavorants such as wintergreen, spearmint, peppermint, birch, anise and fruit flavors such as cherry, lemon-lime, orange, grape, etec., or mixtures thereof, are commercially available, and may be suitably used within the teachings of the present invention. Active ingredients are also commercially available for incorporation in the confectionary product to provide, for example, a breath freshener product. The amount of coloring, flavorants and/or active ingredients used with the teachings herein will vary depending upon considerations well known to those skilled in the confectionary arts.

The vessel 10 produces a confectionary solution having a melt temperature between 280° and 320° F. The confectionary solution has a moisture content between 1 and 4 percent, preferably between 2 and 3 percent.

The prepared confectionary solution is then introduced into a pressurizing vessel 12 which subjects the solution to a superatmospheric gas pressure for a sufficient length of time to cause the absorption therein of a suitable amount of gas. The pressurizing gas may be carbon dioxide, nitrogen, air, or other suitable gases, although carbon dioxide is a preferred gas. Carbon dioxide is introduced into the pressurizing vessel in the range from 50–500 psig, preferably in the range 350–450 psig. The vessel also includes mixer blades 14 which are suitably driven as by a motor 16. The mixer may be driven in a range from 200–1500 rpm, preferably in the 500–900 rpm range. The confectionary solution is maintained in the pressurizing vessel for a suitable length of time to cause absorption of a given amount of gas into the melt solution. For instance, usually less than ten minutes, normally two to six minutes, is sufficient to complete carbonation of a sugar confectionary solution. Vessel 12 may be a Parr bomb, a small commercially available pressurized vessel equiped with rotary mixing blades. The amount of gas absorbed in the solution may range from 0.25–5 cc of gas per gram of confectionary product.

The gasified confectionary solution is then transferred to an injection cylinder 18 such as that used in injection of plastics. The injection cylinder then injects the confectionary solution into a suitable prepressurized mold 20. The gasified confectionary solution is injected into the mold at a pressure in excess of the pressure at which the pressurizing vessel gasifies the solution, preferably several times that pressure. In one preferred embodiment, the injection pressure is five times the gasification pressure of the pressurizing vessel. The high injection pressure has an advantageous effect of reducing the average bubble size in the solution, which also results in a clearer confectionary product (the clarity or translucence of the resultant confectionary product is related to the size of gasification bubbles therein).

The mold 20 may be a suitable multi-cavity type having individual mold cavities 22. The mold and operating procedures thereof may be similar to those utilized in injection molding in the plastics industry. Additionally in accordance with the teachings of the present invention, the mold is initially prepressurized prior to the injection therein of the gasified confectionary solution. The preinjection pressure may be the same as the pressure utilized to gasify the solution in the pressurization vessel. The injection pressure applied by cylinder 16 forces the confectionary solution to flow through the mold into the mold cavities 22.

The temperature of the mold both during and after the injection step is also an important factor in the practice of the present invention. At mold temperatures below approximately 70° F. a carbonated sugar-based solution at the moisture content specified above often will not completely fill the mold. Accordingly, the temperature of the mold should be above a temperature of 70° F., and preferably should be in the 80° F. to 90° F. range at the time of introduction of the confectionary solution therein. Temperatures above 90° F. are to be avoided in the mold since carbonated candy pieces discharged above that temperature often balloon during storage. Furthermore after injection of the solution therein, the mold may be cooled by a coolant 24 to minimize the cycling time for the injection molding process. Cooling of the mold, which may take the form of either air or water cooling 24 around the mold, results in more rapid solidification of the confectionary solution therein.

FIG. 2 illustrates details of one possible commercial embodiment of the present invention utilizing several commercially available components. A batching system of the type which is commercially available from Howe Richardson Company mixes in a mixing vessel ingredients from sources of sucrose 32, hot water 34 and lactose 36 to prepare the confectionary solution in a mixing vessel 38.

The prepared confectionary solution is then passed through a dissolver 40 of the kind which is commercially available from Baker Perkins Company to a holding tank 42. From the holding tank, the solution is pumped by a suitable pump 44 to a microfilm evaporator 46, also commercially available from Baker Perkins Company, wherein the moisture content of the solution is reduced. The evaporation may be conducted at atmospheric pressure, or preferably under a vacuum up to 15 inches of mercury.

The confectionary solution is then passed to a suitable holding tank 48, from which it is pumped by a high pressure pump 49 to a pressurizing vessel 47. The pressurizing vessel may be a commercially available continuous carbonator system, in which the confectionary solution is subjected to a superatmospheric pressure of carbon dioxide from a source 50 for several minutes to cause the absorption therein of a given quantity of carbon dioxide. The carbonator includes a heat exchanger 52 such that the temperature of the carbonated solution may be adjusted either higher or lower to allow proper operation of an extruder 54, which may be a type which is commercially available for the plastic extruding industry. The confectionary solution, while being maintained at the superatmospheric pressure of the carbonator, is then directed to the input of the extruder, which includes heating bands to maintain the solution in a proper temperature range.

The extruder includes a hydraulically operated injection ram 56 which injects the confectionary solution through a sleeve 58 to a plasticizing chamber 60, then through a heated torpedo 64 to the nozzle 66 and then into a hydraulically mold 68. The hydraulic injection ram generates the high injection pressure, which is several times, preferably five, the pressure in the continuous carbonator 50. The higher injection pressure assists in reducing the average diameter of the carbonation bubbles in the resultant candy product. A hydraulic clamping system 70 includes a clamping ram 72 which applies force to one half of the separable, multicavity mold during the injection process.

After injection, the solution is allowed to cool and solidify in the mold under pressure, after which the clamping ram is removed, pressure released, and the two piece mold separated to allow removal of the resultant carbonated candy pieces. The mold may be provided with either a gaseous or liquid coolant to expedite cooling and solidification of the confectionary solution.

Figure 2B:
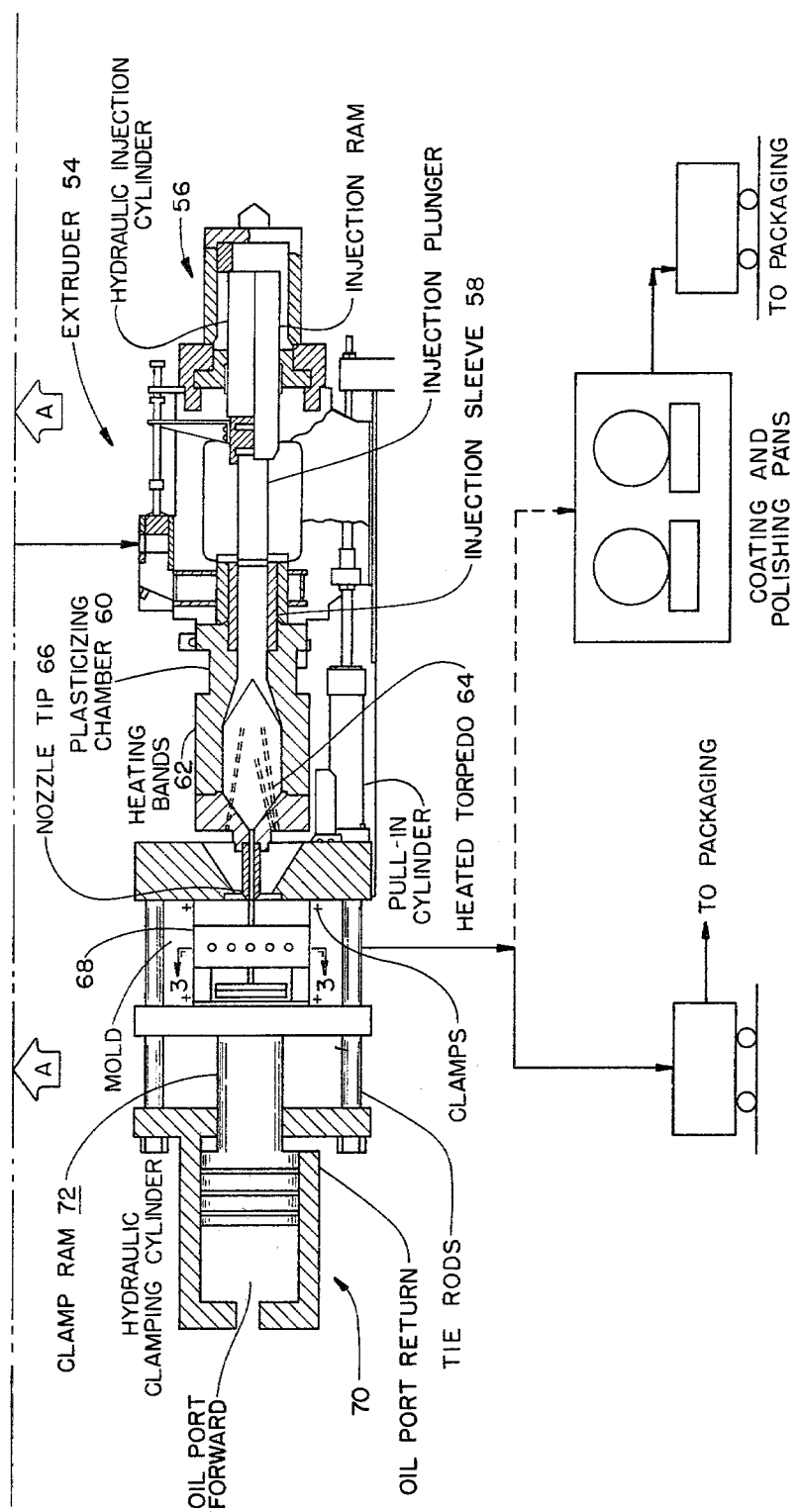
Figure 3:
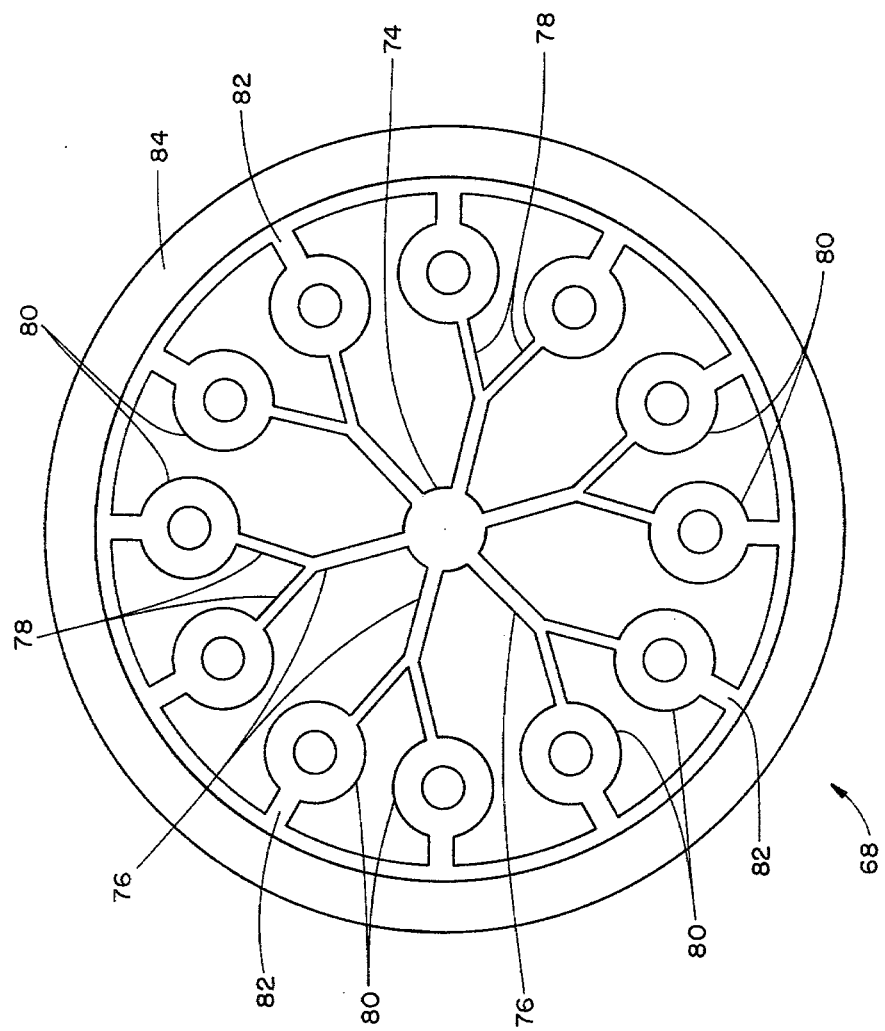
FIG. 3 is a view taken along line 3—3 in FIG. 2 of one half of a suitable multi-cavity mold for producing molded confectionary candies.

FIG. 3 is a view along line 3—3 in FIG. 2, and illustrates one half of an appropriate confectionary mold. The injected confectionary solution flows from the nozzle tip 66 into a central injection passageway 74. Radially projecting runner tracks 76 then carry the injected solution radially outwardly, where the runner tracks may split another time before feeding through runner tracks 78 to lifesaver shaped mold cavities 80. A small amount of excessive confectionary solution may be allowed to overflow from the mold through radially extending passages 82. An annular area 84 around the exterior peripheral regions of the mold is provided to seat an annular seal which seals the two mold halves together during the injection molding process.

The resultant product should be stored at relatively cool temperatures as storage temperatures above 90° F. could result in ballooning of the resultant products.

The discrete pieces of carbonated candy produced in a manner as described above can serve as the finished product, and accordingly may pass from the molding equipment directly to packaging. Optionally as illustrated in FIG. 2b final coatings of a variety of types may be applied to the carbonated candy. These coatings improve the storage stability of the product and also improve the mechanical stability and appearance thereof. For example, a hard coat of edible shellac or varnish, colored if desired, can be applied to the confection. In another embodiment a shiny, hard sugared coating may be applied by a procedure known in the confectionary industry as "pan coating" where the coating is applied and polished. In another embodiment a dry coating of sugar may be applied by a coating machine known as a "dry coater." Again, a polished coating of edible beeswax or carnauba wax may be applied by procedures well known in the confectionary art.

The carbonated candy of this invention may be packaged by wrapping the individual pieces and combining a number of these wrapped pieces in an outer wrapping or alternately, a number of the individual pieces may be stacked and wrapped together in a package. Any of the packaging procedures well known in the confectionary art may be employed to produce the carbonated candy of this invention in packaged form.

Although several embodiments of the present invention have been described in detail herein, it will be apparent to one of ordinary skill in the confectionary arts that many modifications of different embodiments may be constructed in accordance with the teachings of the present invention.

What is claimed is:

1. A method for preparing gasified candy, having gas entrained at superatmospheric pressure in the final candy product such that as the candy melts during consumption thereof it releases the gas to produce a tingling popping effect in the mouth, by pressurized injection in a mold, comprising:
   a. preparing a confectionary solution;
   b. subjecting the confectionary solution to a superatmospheric gas pressure in a pressurized vessel for a sufficient length of time to cause absorption of an amount of gas into the solution;
   c. pressurizing an injection mold at a superatmospheric pressure;
   d. injecting the gasified confectionary solution into said superatmospherically pressurized injection mold at a pressure above the superatmospheric gas pressure utilized in said pressurizing vessel and;
   e. allowing the confectionary solution to solidify in the mold to entrain therein gas at a superatmospheric pressure in the resultant candy product, whereby as the candy melts during consumption it releases the gas to produce a tingling popping effect in the mouth.

2. A method for preparing gasified candy by pressurized injection in a mold as claimed in claim 1, including mixing the confectionary solution while it is being gasified in the pressurizing vessel.

3. A method for preparing gasified candy by pressurized injection in a mold as claimed in claim 1, wherein said step of injecting includes injecting the confectionary solution into said injection mold at a pressure several times the superatmospheric pressure in said pressurizing vessel.

4. A method for preparing gasified candy by pressurized injection as claimed in claim 3, said step of injecting including the step of injecting the confectionary solution into said mold at a pressure of approximately five times the superatmospheric pressure in the pressurizing vessel.

5. A method for preparing gasified candy by pressurized injection in a mold as claimed in claim 1, said step of preparing a confectionary solution including the step of preparing a melted sugar solution.

6. A method for preparing gasified candy by pressurized injection in a mold as claimed in claim 1, said step of subjecting the confectionary solution to a superatmospheric gas pressure in a pressurized vessel including the step of subjecting the confectionary solution to a superatmospheric pressure in the range of from 50–500 psig.

7. A method for preparing gasified candy by pressurized injection in a mold as claimed in claim 1, said step if injecting the gasified confectionary solution into an injection mold including the step of injecting the confectionary solution into multiple cavities in the mold.

8. A method for preparing gasified candy by pressurized injection in a mold as set forth in claim 1, said step of subjecting the confectionary solution to a superatmospheric gas pressure including the step of subjecting the confectionary solution to a superatmospheric pressure of carbon dioxide.

9. A method for preparing gasified candy by pressurized injection in a mold as claimed in claim 1, said step of preparing a confectionary solution including the step of preparing the solution in a temperature range of 225°–325° F.

10. A method for preparing gasified candy by pressurized injection in a mold as claimed in claim 1, including the step of cooling the confectionary solution after it is injected into the mold to cause a solidification of the solution therein.

11. Apparatus for the preparation of gasified candy, having gas entrained at superatmospheric pressure in the resultant candy product such that as the candy melts during consumption thereof it releases the gas to produce a tingling popping effect in the mouth, by pressurized injection in a mold, comprising:
   a. means for preparing a confectionary solution;
   b. pressurizing vessel means for subjecting the confectionary solution produced by said preparing means to a superatmospheric gas pressure for a sufficient length of time to cause absorption of an amount of gas into the solution;
   c. an injection mold for forming the gasified confectionary solution into suitably shaped pieces of candy;
   d. means for pressurizing said injection mold at a superatmospheric pressure prior to injection of the gasified confectionary solution into the mold; and
   e. means for injecting the gasified confectionary solution into said injection mold at a pressure above the superatmospheric gas pressure utilized in said pressurizing vessel such that as the confectionary solution solidifies in the mold it entrains gas at a superatmospheric pressure in the resultant candy product, whereby the entrained gas is released during consumption thereof to produce a tingling popping effect in the mouth.

12. Apparatus for the preparation of gasified candy by pressurized injection in a mold as claimed in claim 11, wherein said pressurizing vessel means includes a mixer therein for stirring the confectionary solution being pressurized therein.

13. Apparatus for the preparation of gasified candy by pressurized injection in a mold as claimed in claim 12, wherein said mixer includes a mixer blade rotated in the range of 200–1500 rpm.

14. Apparatus for the preparation of gasified candy by pressurized injection in a mold as claimed in claim 11, wherein said injecting means includes means for injecting the solution at a pressure several times the superatmospheric pressure in said pressurizing vessel.

15. Apparatus for the preparation of gasified candy by pressurized injection in a mold as claimed in claim 14, wherein said injecting pressure is maintained at approximately five times the superatmospheric pressure in said pressuring vessel.

16. Apparatus for the preparation of gasified candy by pressurized injection in a mold as claimed in claim 11, said preparing means including means for preparing a melted sugar solution.

17. Apparatus for the preparation of gasified candy by pressurized injection in a mold as claimed in claim 11, said pressurizing vessel means including means for subjecting the confectionary solution to a superatmospheric pressure in the range of from 50–500 psig.

18. Apparatus for the preparation of gasified candy by pressurized injection in a mold as claimed in claim 11, said injection mold being a multi-cavity mold.

19. Apparatus for the preparation of gasified candy by pressurized injection in a mold as claimed in claim 11, said pressurizing vessel means including means for subjecting the confectionary solution to a superatmospheric pressure of carbon dioxide.

20. Apparatus for the preparation of gasified candy by pressurized injection in a mold as claimed in claim 11, wherein said preparing means includes for preparing a confectionary solution having a temperature in the range of 280°–320° F.

21. Apparatus for the preparation of gasified candy by pressurized injection in a mold as claimed in claim 11, said injection mold including a cooling means for cooling the confectionary solution under pressure after injection in the mold.

* * * * *